United States Patent
Buraczewski et al.

(10) Patent No.: US 12,362,925 B2
(45) Date of Patent: Jul. 15, 2025

(54) METHOD FOR REMOTE GENERATION OF TWO ARBITRARY-LENGTH IDENTICAL RANDOM CRYPTOGRAPHIC KEYS WITH THE DEVICE-INDEPENDENT SECURITY USING ENTANGLED MULTI- PHOTON SOURCES OF QUANTUM LIGHT

(71) Applicant: LEVELQUANTUM S.R.L., Milan (IT)

(72) Inventors: Adam Juliusz Buraczewski, Varsavia (PL); Thomas George McDermott, Varsavia (PL); Magdalena Stobinska, Varsavia (PL)

(73) Assignee: LEVELQUANTUM S.R.L., Milan (IT)

( * ) Notice: Subject to any disclaimer, the term of this patent is extended or adjusted under 35 U.S.C. 154(b) by 0 days.

(21) Appl. No.: 18/863,577

(22) PCT Filed: May 9, 2023

(86) PCT No.: PCT/IB2023/054783
§ 371 (c)(1),
(2) Date: Nov. 6, 2024

(87) PCT Pub. No.: WO2023/218341
PCT Pub. Date: Nov. 16, 2023

(65) Prior Publication Data
US 2025/0112766 A1    Apr. 3, 2025

(30) Foreign Application Priority Data
May 9, 2022    (IT) ........................ 102022000009479

(51) Int. Cl.
*H04L 9/08*    (2006.01)
*G02F 1/35*    (2006.01)
(Continued)

(52) U.S. Cl.
CPC .......... *H04L 9/0861* (2013.01); *G02F 1/3526* (2013.01); *G02F 1/3553* (2013.01);
(Continued)

(58) Field of Classification Search
None
See application file for complete search history.

(56) References Cited

U.S. PATENT DOCUMENTS 7,304,788 B2 * 12/2007 McKinstrie ........... G02F 1/3536
359/332
9,465,274 B1 * 10/2016 Soh ........................ G02F 1/3536
(Continued)

FOREIGN PATENT DOCUMENTS

CN    104459623 A * 3/2015 .............. G01S 11/12
CN    104092539 B * 12/2017
(Continued)

OTHER PUBLICATIONS

N. Gisin et al., "Quantum communication", Nature Photonics, vol. 1, pp. 165-171, Mar. 2007.
(Continued)

*Primary Examiner* — Ali H. Cheema
(74) *Attorney, Agent, or Firm* — Workman Nydegger

(57) ABSTRACT

A method of generating a random symbol sequence using quantum opto-electronic devices A and B with device-independent security is disclosed. The method is characterized by the two sources each producing entangled two-beam, pulsed multiphoton quantum states of light and sending one beam to a quantum interference and measurement device C. Before being sent, the beams are multiplexed with coherent beams. Quantum interference and measurement device C demultiplexes them and uses coherent beams for compensating the fluctuations in the quantum beams. Then, it interferes quantum beams on a beam splitter,
(Continued)

measures the output and sends results back. Subsequently, A and B share an entangled state. They interfere local beams with coherent light on beam splitters and measure on detectors. A fraction of measurements are kept secret and used as the source of symbols forming the cryptographic key, while others are used to establish the security using an entanglement test.

20 Claims, 2 Drawing Sheets

(51) Int. Cl.
　　　G02F 1/355　　　(2006.01)
　　　H04L 9/00　　　　(2022.01)
(52) U.S. Cl.
　　　CPC .............. *H04L 9/00* (2013.01); *H04L 9/0816* (2013.01); *H04L 9/0819* (2013.01); *H04L 9/0825* (2013.01); *H04L 9/0827* (2013.01); *H04L 9/0852* (2013.01); *H04L 9/0855* (2013.01); *H04L 9/0858* (2013.01)

(56) References Cited

U.S. PATENT DOCUMENTS

| | | | | |
|---|---|---|---|---|
| 10,992,391 B1 * | 4/2021 | Meyers | ............. | H04B 10/0799 |
| 2009/0268276 A1 * | 10/2009 | Lee | ............. | H04B 10/70 |
| | | | | 359/330 |
| 2012/0134676 A1 * | 5/2012 | Kikuchi | ............. | H04J 14/06 |
| | | | | 398/65 |
| 2013/0089888 A1 * | 4/2013 | Woodward | ............. | G01N 21/41 |
| | | | | 356/128 |
| 2014/0099104 A1 * | 4/2014 | Peters | ............. | H04B 10/2507 |
| | | | | 398/25 |
| 2014/0112478 A1 * | 4/2014 | Arahira | ............. | H04L 9/0852 |
| | | | | 380/278 |
| 2015/0036819 A1 * | 2/2015 | Arahira | ............. | H04L 9/0858 |
| | | | | 380/44 |
| 2017/0026175 A1 * | 1/2017 | Zhang | ............. | H04L 9/0852 |
| 2018/0231868 A1 * | 8/2018 | Grice | ............. | H04B 10/70 |
| 2019/0379536 A1 * | 12/2019 | Han | ............. | H04L 9/3268 |
| 2021/0141609 A1 * | 5/2021 | Huang | ............. | H04L 9/0852 |
| 2022/0075237 A1 * | 3/2022 | Mittal | ............. | G02F 1/3526 |
| 2025/0007698 A1 * | 1/2025 | Heilmann | ............. | H04L 9/0852 |

FOREIGN PATENT DOCUMENTS

| | | | | |
|---|---|---|---|---|
| CN | 112771852 A * | 5/2021 | ............. | G02F 1/3532 |
| CN | 114465715 A * | 5/2022 | | |
| EP | 4099585 A1 * | 12/2022 | ............. | H04B 10/70 |
| GB | 2542189 A * | 3/2017 | ............. | G02F 1/3553 |
| GB | 2599048 A * | 3/2022 | ............. | G02F 1/35 |
| JP | 2011048093 A * | 3/2011 | ............. | G02F 1/3519 |
| JP | 5434440 B2 * | 3/2014 | ............. | G02F 1/39 |
| JP | 5488342 B2 * | 5/2014 | ............. | H04B 10/70 |
| KR | 102384383 B1 * | 4/2022 | | |
| WO | WO-2017034638 A1 * | 3/2017 | ............. | G02F 1/31 |

OTHER PUBLICATIONS

J.-P. Bourgoin et al., "A comprehensive design and performance analysis of low Earth orbit satellite quantum communication", New Journal of Physics, vol. 15, 023006, Feb. 2013, (corrected 2014 New J. Phys. 16 069502.
M. Stobińska et al., "Bell-inequality tests with macroscopic entangled states of light", Phys. Rev. A 84, 034104, Sep. 22, 2011.
J. Yin et al., "Satellite-based entanglement distribution over 1200 kilometers", Science 356, pp. 1140-1144, Jul. 5, 2017.
J.-W. Pan et al., "Multiphoton entanglement and interferometry", Rev. Mod. Phys. 84, 777, May 11, 2012 (preprinted Sep. 26, 2011).
A. Dutt et al., "On-chip optical squeezing", Phys. Rev. Applied 3, 044005, Apr. 2, 2015.
J. F. Clauser et al., "Proposed experiment to test local hidden-variable theories", Phys. Rev. Lett., vol. 23, No. 15, pp. 880-884, Oct. 13, 1969.
D. Collins et al., Bell Inequalities for Arbitrarily High-Dimensional Systems:, Phys. Rev. Letts. 88, 040404, Jan. 28, 2002.
S. L. Braunstein et al., "Wringing out better Bell inequalities", Ann. Phys., vol. 202, pp. 22-56, Aug. 15, 1990.
N. Brunner, et al., "Bell nonlocality", Rev. Mod. Phys. 86, 419, Apr. 19, 2014.
M. B. Plenio, "Logarithmic negativity: a full entanglement monotone that is not convex", Phys. Rev. Lett. 95, 090503, Aug. 26, 2005.
R. G. Gallager, "Low density parity check codes", IRE Trans. Inf. Theory 8, 21 (1962).
A. E. Lita et al., "Counting near-infrared single-photons with 95% efficiency", Opt. Express 3032, vol. 16, Feb. 20, 2008.
M. E. Mycroft et al., "Proposal for distribution of multi-photon entanglement with TF-QKD rate-distance scaling", Phys. Rev. A 107, 012607, Dec. 17, 2021 (preprint located at https://arxiv.org/abs/1812.10935).
L.-J. Wang et al., "Experimental authentication of quantum key distribution with post-quantum cryptography", npj Quantum Inf. 7, 67 (2021).
Liu et al., "Fully passive entanglement based on quantum key distribution scheme", arxiv.org, arXiv:2111.03211v1, Cornell University Library, Nov. 5, 2021.
Mycroft et al., "Efficient long-range distribution of multi-photon entanglement", 2021 IEEE Photonics Conference (IPC), IEEE, Oct. 18, 2021, pp. 1-2.
International Search Report and Written Opinion, mailed Aug. 7, 2023, for PCT Int. App. PCT/IB2023/054783, 11 pages.

\* cited by examiner

METHOD FOR REMOTE GENERATION OF TWO ARBITRARY-LENGTH IDENTICAL RANDOM CRYPTOGRAPHIC KEYS WITH THE DEVICE-INDEPENDENT SECURITY USING ENTANGLED MULTI- PHOTON SOURCES OF QUANTUM LIGHT

BACKGROUND

Technical Field

The present disclosure generally relates to the field of cryptography.

More in particular, the disclosure concerns a method for generating a shared cryptographic key using two quantum sources of light with a device-independent security.

Description of the Related Art

Quantum communication (QC) is a branch of quantum information processing which is devoted to creating encrypted channels using random keys obtained from quantum-correlated states of photons [1]. One of the QC solutions relies on quantum entanglement, a physical phenomenon which allows distant parties to obtain the same random symbols from photonic states which are delivered to them by e.g. an optical fiber or through free space (vacuum or atmosphere). The random symbols are then used for encryption and decryption of data in information technology tasks. The security of the entanglement-based QC comes from the fact that any additional interaction with a quantum state, which could be caused by e.g. eavesdropping, alters this state and spoils existing quantum correlations. This is guaranteed by the means of quantum monogamy property of quantum entanglement. Quantum correlations as well as produced randomness are tested with an entanglement test based on a Bell inequality, forming a real-time security check of the quantum channel which is performed in parallel with the QC scheme. If this test fails, it means that either the generated symbols are not random or the communication is compromised and thus, it cannot be trusted. If the test succeeds, the symbols can be used in information technology tasks and device-independent security is guaranteed by the laws of physics.

Up to date, the random symbols in QC solutions were generated from either the polarization or phase of photons, which are difficult to maintain and very fragile [1]. The protocols were based on single-photon pairs which are difficult to obtain with current equipment and thus, most solutions utilized weakly-squeezed quantum states where higher-order contributions were neglected. Since only a fraction of generated photon pairs were received by the communicating parties due to e.g. losses in the atmosphere, they had to additionally communicate with a separate channel and sample/filter the quantum states which were suitable for producing random symbols [4]. However, this sampling/filtering introduced a loophole which could be used by an attacker (an eavesdropper) to falsify the results of the entanglement test [3] and device-independent security was not provided. Furthermore, the obtained key rates, especially in the presence of large atmospheric losses, were very low, making generation of a suitable long random key a fragile and lengthy process [4].

In [14] a novel method of a distribution of multiphoton entanglement with optimal rate-distance scaling was proposed. In it, the two sources based on spontaneous parametric down-conversion located in two stations A and B produced entangled light each. One beam was sent directly to a central authority while the other was kept locally and used for quantum information tasks, such as QC for example. The central authority interfered the beams and publicly announced the result, in this way performing an entanglement swapping scheme and creating a shared entanglement between A and B. The local beams were interfered with strong coherent light which ensured reaching the homodyne limit. The scheme assumed constant phases of the beams and assumed interference of local beams with strong coherent light (local oscillators) making difficult to implement it.

BRIEF SUMMARY

One embodiment of the present disclosure is a method for generating a shared cryptographic key for data encryption/decryption as defined in the enclosed claim 1 and other embodiments are disclosed in the dependent claims 2 to 7 and 11 to 20.

The Applicant has perceived that the method according to the present disclosure has the following advantages:
- it allows to build Quantum Communication systems which are more secure and efficient, while using only readily available components;
- it achieves a higher rate of key generation;
- it uses additional coherent light beams multiplexed with quantum beams for fine tuning of the quantum interference and compensating for phase fluctuations, varying optical path lengths and lost synchronization caused by the properties of the medium through which the beams are sent;
- it uses realistic measurement and Bell inequality test which harnesses interference with weak coherent beams on precise beam splitters to achieve device-independent security.

One embodiment of the present disclosure is a computer-readable storage medium as defined in the enclosed claim 8.

One embodiment of the present disclosure is a quantum opto-electronic and computing system as defined in the enclosed claim 9 and another embodiment is disclosed in the dependent claim 10.

BRIEF DESCRIPTION OF THE SEVERAL VIEWS OF THE DRAWINGS

Further characteristics and advantages of the disclosure will emerge from the following description of an embodiment and variants thereof, said description being provided by way of example with reference to the enclosed drawings, wherein.

DETAILED DESCRIPTION

Figure 1:
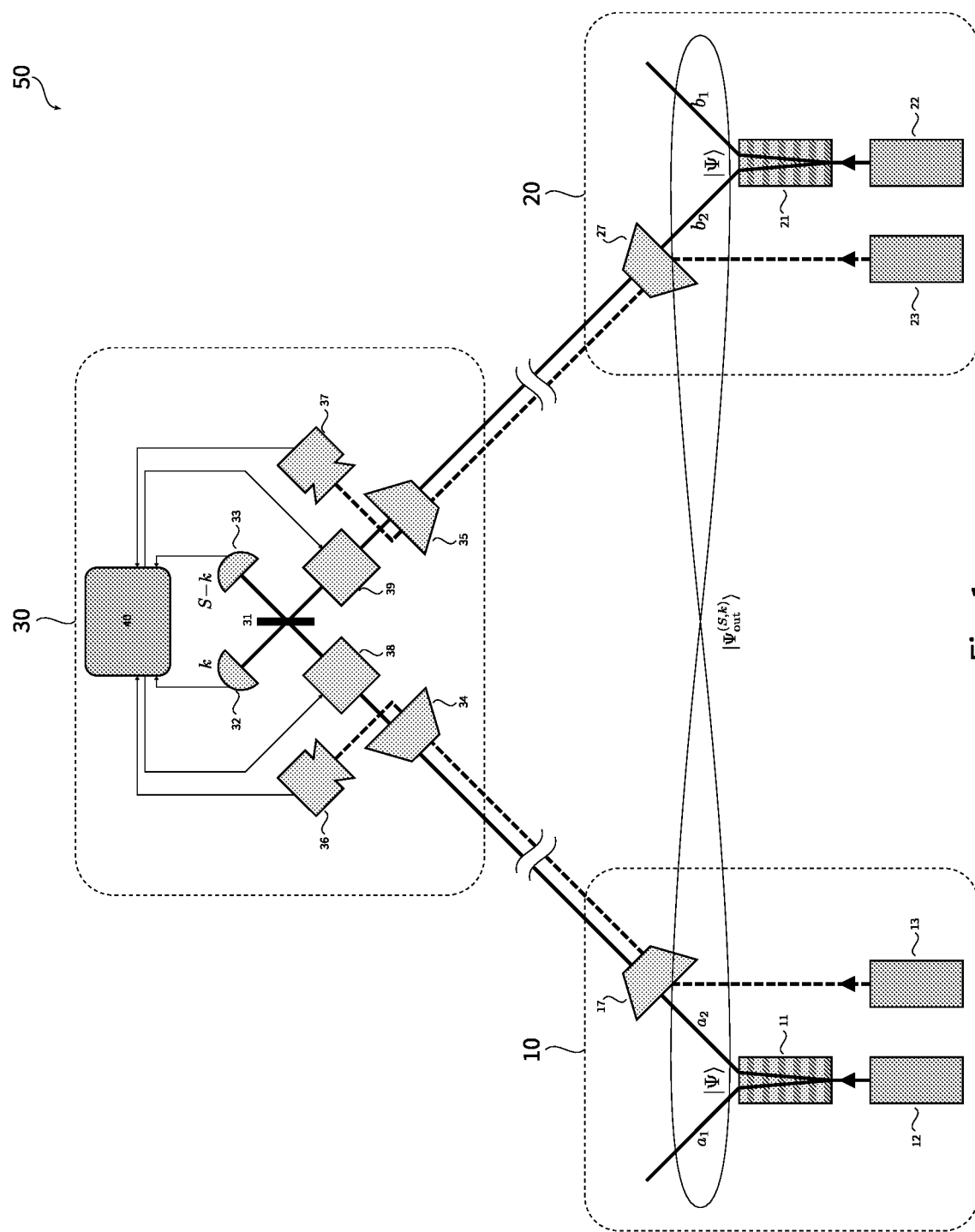
FIG. 1 schematically shows a quantum opto-electronic and computing system for implementing a quantum entanglement distribution protocol according to the disclosure.

It should be noted that in the description that follows identical or similar blocks, components or modules have the same reference numerals, regardless of whether they are shown in different embodiments of the disclosure.

The disclosure relates to a high security method of a secret key exchange relying on the quantum properties of multiphoton light sources—so called Quantum Key Distribution (QKD). This allows two parties 10, 20 to obtain a shared key composed of random symbols, with the security of the key being guaranteed by the laws of physics and tested with a Bell inequality to achieve device-independent security. The key can then be used for secure encryption and decryption of subsequent communication or data storage in information technology tasks [1].

Parties 10, 20 are implemented with quantum opto-electronic devices.

The disclosure comprises three components (i.e. phases), making it a full technological stack:
1) a method for establishing a quantum channel between distant parties;
2) a real-time security check of the quantum channel; and
3) a method for using the quantum channel to generate two arbitrary-length secret keys made of identical random symbols which can be used for encrypted communication, data storage or other information technology purposes.

The scheme utilizes a quantum and computing apparatus which contains readily available quantum-photonic and electronic elements (commercial-off-the-shelf components, COTS).

The first component shown in FIG. 1 is an efficient protocol for establishing a quantum channel via an optical link in a way that is robust against high losses e.g. in an optical fiber or in the atmosphere, making it especially suitable for long-distance fiber-based or satellite-based quantum communications (QC) [2]. The quantum channel takes the form of highly entangled multiphoton quantum states which are shared between two parties A and B.

A real-time security check of the quantum channel forms the second component, this test ultimately checks that the quantum states of light carry enough quantum correlations and provide truly random symbols which can form a shared secret key. The test is based on a Bell inequality, which must be significantly violated to prove the existence of quantum correlations. A positive result of this test indicates complete security of subsequent communication, even if any hardware component has been provided by, or altered by, a malicious agent and thus cannot be trusted (device-independent security).

The actual conversion of quantum states to random symbols is realized with the described entanglement-based quantum key distribution (QKD) protocol implemented by a computing and control subsystem 40 in parallel to the security check, which forms the third component. This component also provides an electronic and programming interface for the technology user, returning the information on the outcome of the test (positive/negative) along with the obtained cryptographic key, which can be used for subsequent information technology tasks.

The features of the underlying quantum channel, in which there is no need to sample or filter quantum states allow the Bell inequality test to be loophole-free, resulting in the secrecy of the obtained random key to be indisputable [3]. Furthermore, if the users decide that they can trust their hardware, the security check does not need to be as strict, and this additional freedom increases the rate of key generation (key rate). This switchable mode of operation depending on the needs of the user, without any change to the hardware or essential characteristics, is an important feature of the scheme.

The invented scheme also introduces additional multiplexed coherent pulsed light beams which are used for synchronization and fine tuning of the system by compensating for inevitable quantum light phase, wavelength and timing fluctuations. Furthermore, since it utilizes multiphoton states, it has the potential to achieve a higher rate of key generation than existing solutions. All these features make the new scheme especially suitable for near-future fiber-based and satellite Quantum Communication applications.

The setup for the distribution of multiphoton entanglement (see FIG. 1) requires two sources 11, 21 of two-mode squeezed vacuum (SV) states $|\Psi\rangle$ [5], sources of coherent pulses (lasers) 13, 23, optical multiplexers 17, 27, optical demultiplexers 34, 35, optical measurement devices 36, 37, optical compensating devices 38, 39, a beam splitter 31 and two photon detectors 32, 33. These photon detectors 32, 33 are ideally photon-number-resolving (PNR) e.g. Transition-Edge Sensors (TES) [13], but if the total photon numbers are low, e.g. due to atmospheric or fiber losses, they can be replaced with other light detection schemes such as one or more single-photon detectors, high-efficiency photo-diodes or combinations thereof, as long as they are characterized by low number of dark counts (i.e. registering a photon in the case of no-photon event). Two-mode squeezed vacuum states are naturally produced by means of either spontaneous parametric down conversion (SPDC) or four-wave mixing in materials which exhibit optical nonlinearity. Examples include the beta-barium borate (BBO) crystal, Lithium niobate ($LiNbO_3$) crystal or potassium-dihydrogen-phosphate (KTP) crystal, which can be integrated on optical chips thanks to the latest advances in integrated quantum optics.

One beam from the sources of states IV) are multiplexed with a coherent pulsed light and directed by the quantum opto-electronic devices 10 and 20 towards a quantum interference and measurement device 30, which demultiplexes the quantum and coherent pulses at optical demultiplexers 34, 35 and measures coherent pulses at optical measurement devices 36, 37, which measure the phase, polarization, wavelength, and arrival time of pulses. Then, it uses the output of this measurement to compensate for the fluctuations in the quantum beams and adjust optical systems to achieve the best interferometric visibility. Then, the quantum interference and measurement device 30 interferes quantum pulses on the beam splitter (BS) 31 and measures the outputs with the photon detectors 32, 33. As a result, the local beams of the states V) become entangled so that the quantum opto-electronic devices 10 and 20 share an entangled quantum state. Furthermore, the quantum interference and measurement device 30 can be either located in proximity of 10 or 20 or at a great distance from the sources of quantum light, the quantum opto-electronic devices 10 and 20, as the channels connecting the sources and the BS are highly robust to transmission losses. It could even be located on a satellite for Earth-space quantum communications applications. In the case the quantum interference and measurement device 30 is located close to 10 or 20, an additional loss may be introduced to compensate for the inequal losses in both optical paths.

Figure 2:
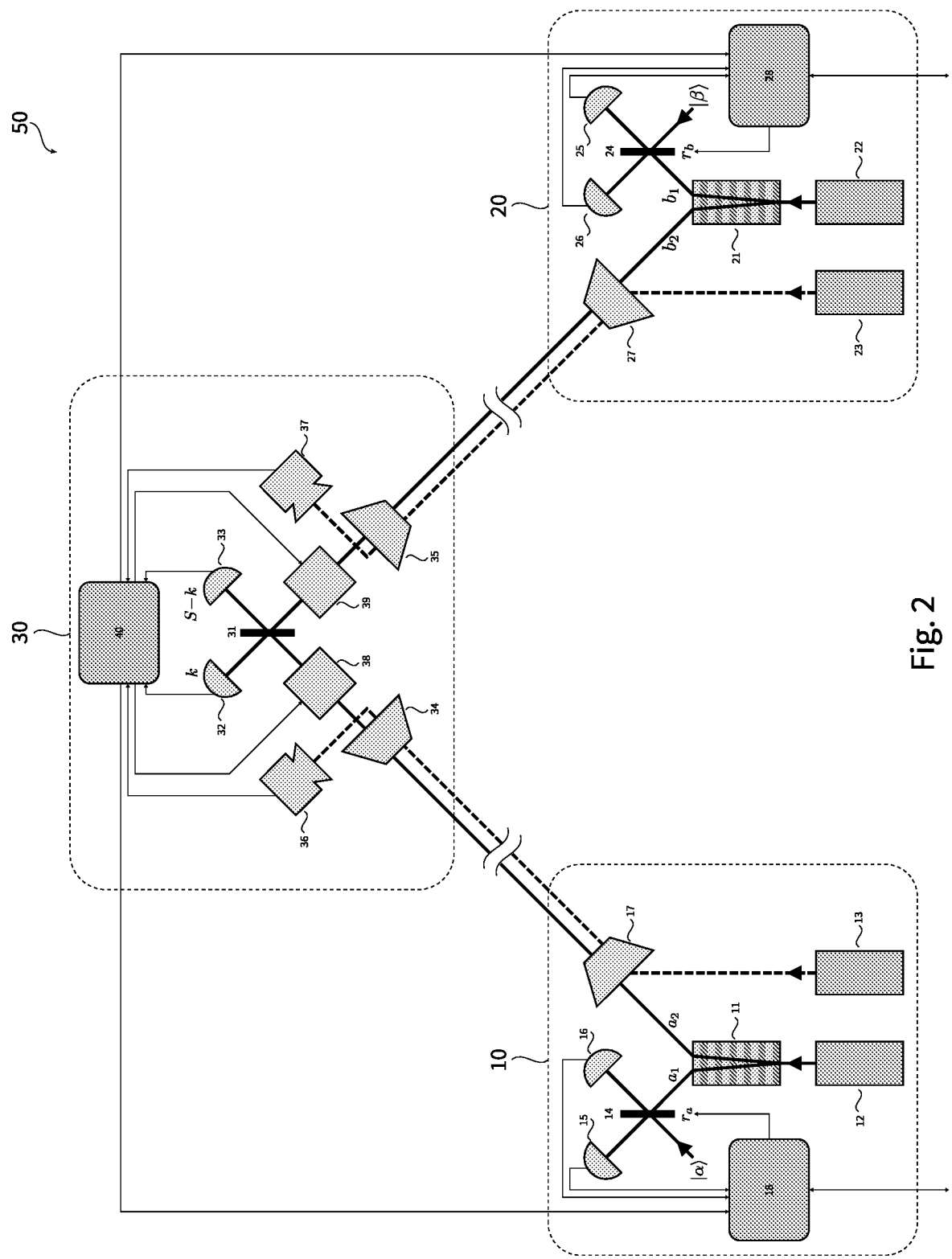
FIG. 2 schematically shows the quantum opto-electronic and computing system for implementing a quantum key distribution scheme and the entanglement test using the quantum entanglement distribution protocol of FIG. 1.

For the procedures of entanglement verification and generating a random secret key, a number of extra components are required: a precise variable beam splitter 14, 24 for both quantum opto-electronic devices 10 and 20, a source 11, 21 of a weak coherent light (lasers) and two additional photon detectors 15, 16, 25, 26 each, see FIG. 2. In the process of verification, each beam of the output state is interfered with the coherent state on the variable beam splitter for different settings computed by the computing subsystem and then the outputs of the beam splitter are measured by photon detectors of high quantum efficiency 15, 16, 25, 26. The process is repeated for many settings of beam splitter reflectivities, chosen randomly from a computed set, some of which are used to establish shared key symbols while others are used to perform the entanglement test which guarantees the security of the key.

The method of producing multiphoton quantum entanglement begins with two distant quantum opto-electronic devices 10 and 20 each producing a two-mode (two beam) squeezed vacuum state $|\Psi\rangle$. This multiphoton quantum state of light is characterised by two beams which are entangled in photon number i.e. measuring n photons in one beam will result in n photons being measured in the second beam, even though n itself is undetermined until the first measurement.

Two-mode squeezed vacuum states are naturally produced by shining laser light upon materials with optical nonlinearity, via either spontaneous parametric down conversion (SPDC) [5] or four-wave mixing [6]. In this way four light beams are generated, beams $a_1$ and $a_2$ are generated at the quantum opto-electronic device 10, while beams $b_1$ and $b_2$ are generated at the quantum opto-electronic device 20. The beams $a_2$ and $b_2$ (customarily called the "idler" beams), after being multiplexed with a coherent pulsed beam at optical multiplexers 17, 27, are sent to the quantum interference and measurement device 30 which demultiplexes them on optical demultiplexers 34, 35, measures their properties (polarization, phase, wavelength and arrival time) using optical measurement devices 36, 37, compensates for optical fluctuations at optical devices 38 and 39, performs an entangling measurement, interfering the two beams on a beam splitter 31 and measuring the output beams with photon detectors of low a dark count rate. As a result, the quantum opto-electronic devices 10 and 20 share an entangled state $|\Psi_{out}^{(k,S)}\rangle$ in the remaining beams $a_1$ and $b_1$ (the "signal" beams). Quantum interference and measurement device 30 then informs the quantum opto-electronic devices 10 and 20 about the measurement outcomes k and S−k, where k denotes the value registered by detector 32 and S−k—by detector 33, via a classical channel (e.g. radio, optical or electronic) so that they know which state was generated.

Both quantum opto-electronic devices 10 and 20 use an additional setup consisting of a precise variable beam splitter 14, 24, weak coherent state source 12, 22 (a laser pump), photon detectors 15, 16, 25, 26 and computing subsystem 18, 28. They then perform an entanglement test according to the following procedure: Both quantum opto-electronic devices 10 and 20 use p and q distinct settings of beam splitter reflectivities $r_{a1}$, $r_{a2}$, $r_{a3}$, ... $r_{ap}$ and $r_{b1}$, $r_{b2}$, $r_{b3}$, ... $r_{bq}$ respectively. These settings are determined jointly by the computing subsystems 18, 28 using a numerical algorithm to maximize the Bell inequality violation, taking into account the parameters of the whole system, such as transmission losses, detection efficiencies, coherent light amplitudes and other characteristics. They can vary in time, depending on the changing conditions of the environment.

For each of the p settings, the quantum opto-electronic device 10 interferes a coherent state $|\alpha\rangle$ of amplitude $\alpha$ with their local beam of state $|\Psi\rangle$ on a beam splitter 14 with reflectivity $r_a$ and measures the output beam with photon detector 15 and, optionally, 16. Symmetrically, the quantum opto-electronic device 20 interferences coherent state $|\beta\rangle$ of amplitude $\beta$ on beam splitter 24 with reflectivity $r_b$ and measures the output beam with photon detector 25 and, optionally, 26. They both repeat this process to build up reliable statistics for each setting and measurement outcome, and then communicate these statistics to each other over an authenticated classical channel. This channel can be authenticated with classical cryptographic methods, such as e.g. Post-Quantum Cryptography [15]. Together they use these statistics to perform an entanglement test which confirms the entanglement of the shared state.

This test could be the evaluation of a Bell inequality such as the Clauser-Horne-Shimony-Holt (CHSH) inequality [7], the Collins-Gisin-Linden-Massar-Popescu (CGLMP) inequality [8], chained inequalities [9], or any other test based on these measurements which confirms quantum entanglement [10].

In one embodiment, the quantum opto-electronic device 10 uses additional settings $r_{a0}$ chosen so that if the quantum opto-electronic device 10 uses these settings and the quantum opto-electronic device 20 uses $r_{b1}$, the measurement results obtained by the quantum opto-electronic devices 10 and 20 are highly correlated. In other words, if the quantum opto-electronic device 10 obtains an outcome X and the quantum opto-electronic device 20 obtains an outcome Y, the quantum opto-electronic device 20 can easily obtain X by a fixed mathematical transform, e.g. the flipping of a single bit in the key, with minimal errors. The measurement results for these settings are kept secret at the computing subsystems, and the series of outcomes X are the source of symbols that form the shared key.

In one embodiment, the quantum opto-electronic devices 10 and 20 use the settings $r_{a_0}$ and $r_{b_1}$ with high probability so that the majority of measurements generate key symbols, leaving just enough other measurements to reliably perform the entanglement test in order to maximize the key rate, while ensuring the secrecy of the key.

In one embodiment, the quantum interference and measurement device 30 performing the entangling measurement is located on a satellite, a vessel, a drone or any other flying object, or at the proximity of 10 or 20, to share parts of the hardware (such as the cryostat where the detectors are operating). In the latter case, it should contain and additional optical element compensating for the inequal photon loss between 10 and 30 vs. 20 and 30.

In one embodiment, the quantum interference and measurement device 30 performing the entangling measurement is connected to the quantum opto-electronic devices 10 and 20 via optical fibers, free-space connection or their combination.

The disclosure will now be described in detail with references to the illustration whose figures present.

FIG. 1 shows the schematic of a quantum opto-electronic system 50 implementing the long-range entanglement distribution protocol. Quantum opto-electronic devices 10 and 20 locally produce two copies of the two-mode squeezed vacuum state $|\Psi\rangle$, e.g. using SPDC or four-wave mixing. One beam from each state, $a_2$ and $b_2$, is multiplexed with a coherent pulsed beam on a optical multiplexer 17, 27 and sent to the quantum interference and measurement device 30, which demultiplexes them on optical demultiplexers 35, 35, measures the coherent beams on optical measurement devices 36, 37, compensates fluctuations and lost synchronization at optical compensating devices 38, 39, and performs an entangling measurement using a beam splitter 31 and PNR photon detectors 32, 33 which detect the number of photons which pass through the beam splitter 31. These measurement outcomes, k and S−k, are announced to the quantum opto-electronic devices 10 and 20 through a radio, optical or other channel. As a result, the quantum opto-electronic devices 10 and 20 share in their beams $a_1$ and $b_1$ a multiphoton entangled state out $|\Psi_{out}^{(k,S)}\rangle$ parametrized by S and k.

FIG. 2 shows the schematic of the quantum opto-electronic and computing system 50 implementing the quantum key distribution (QKD) scheme and the entanglement test using the long-range entanglement distribution protocol. Quantum opto-electronic devices 10 and 20 perform long-range entanglement distribution using two sources of squeezed vacuum and 30 according to FIG. 1. In addition, the quantum opto-electronic devices 10 and 20 hold setups consisting of coherent state (laser) sources $|\alpha\rangle$ and $|\beta\rangle$ respectively, precise variable beam splitters 14, 24 with reflectivities, $r_a$ and $r_b$ respectively, and photon detectors 15, 16, 25, 26. By performing a procedure, in which measurements are performed for different beam splitter settings $r_{a0}$, $r_{a1}$, $r_{a2}$, $r_{a3}$, ... $r_{ap}$ and $r_{b1}$, $r_{b2}$, $r_{b3}$, ... $r_{bq}$, 10 and 20 can realize an entanglement test procedure using an Bell inequality test and a quantum key distribution (QKD) scheme.

Component 1—Method for establishing a quantum channel

Multi-photon entanglement is naturally created by shining laser light upon materials with an optical nonlinearity, via either spontaneous parametric down conversion (SPDC) [5] or four-wave mixing [6], both of which deterministically produce a two-mode squeezed vacuum (SV) state.

The SV state $|\Psi\rangle$ is entangled i.e. it exhibits perfect quantum correlations which are manifested by equal photon numbers in two light beams called the signal and idler which can be spatially separated. In the proposed protocol, depicted in FIG. 1, we require two separate copies of the state $|\Psi\rangle$ as our input. The idler beams from the two sources, $a_2$ from source at the quantum opto-electronic device 10 and $b_2$ from source at the quantum opto-electronic device 20, interfere on a beam splitter 31 located on a quantum interference and measurement device 30, where they are subsequently detected.

To make it possible, beams $a_2$ and $b_2$ must be first multiplexed with coherent pulsed light, either in time or frequency using optical multiplexers 17, 27. In the former case, quantum and classical pulses are interleaved, for example after x classical pulses, y quantum pulses are sent through the same optical path. Since their other properties, e.g. phase, amplitude, polarization and frequency are the same, they undergo the same modifications. The quantum interference and measurement device 30 can demultiplex them using corresponding optical demultiplexers 34, 35, measure them using optical measurement devices (e.g. CCD cameras) 36, 37 and perform compensation with e.g. electro-optic phase modulators, path delays (located either at 10 or 20 or 30) and other optical devices 38, 39 which will maximize the quantum interference visibility. This approach slightly lowers the speed of the key generation. Alternatively, in the case of frequency multiplexing, both classical and quantum pulses are sent in the same time, thus the speed is not lowered. However, since they have different frequencies, they could undergo different fluctuations and it could be more difficult to compensate.

If there are no photon losses between the sources at the quantum opto-electronic devices 10, 20 and the quantum interference and measurement device 30, the detection of S photons in total at the quantum interference and measurement device 30 means that S photons distributed between two beams $a_2$ and $b_2$ entered the beam splitter 31 and that there must be S photons in total in the signal beams $a_1$ and $b_1$.

The detection at the quantum interference and measurement device 30 is referred to as an entangling measurement because, consequently, the signal beams $a_1$ and $b_1$ become entangled, forming a shared quantum state out $|\Psi_{out}^{(k,S)}\rangle$. The amount of the final entanglement shared between the parties is uniquely parameterized by the measurement outcomes, k and S-k and can be quantified, e.g. via entropy of entanglement or logarithmic negativity [11]. The amount of entanglement is close to maximal, even with large losses in the idler beams. This feature is very important from the point of view of the free-space (e.g. satellite-based) QC, when the produced entangled quantum state still retains a high amount of entanglement despite significant attenuation in the atmosphere.

If the total photon numbers are low such that a probability to measure S>1 is negligible, the PNR detectors at C may be replaced with other methods of light detection such as one or more single-photon detectors, avalanche photo-diodes or combinations thereof.

Component 2—Real-Time Security Check of the Quantum Channel

Entanglement may be defined as randomness shared between multiple parties, producing correlations between measurements made by these parties which cannot be explained with classical (non-quantum) physics or statistics. These quantum correlations can be distinguished from classical correlations by the violation of certain mathematical inequalities derived from classical statistics such as Bell inequalities [10]. The quantum states of light generated in Component 1 may thus be certified by means of a Bell test which checks for violation of the Bell inequality. This test ensures that the quantum opto-electronic devices 10 and 20 share an quantum entangled state which may be employed in quantum key distribution or other quantum information tasks. In addition to the shared entangled state, the quantum opto-electronic devices 10 and 20 both include a precise variable beam splitter 14, 24, and a source 11, 12 of coherent light i.e. a laser. This scheme is depicted in FIG. 2.

Both quantum opto-electronic devices 10, 20 interfere their half of the shared state with coherent light on a respective variable beam splitter 14, 24, and then measure the number of transmitted photons using photon detectors 15 and 25. The beam splitter reflectivities are chosen by the computing subsystems randomly immediately prior to the interference from among possible values computed numerically to maximize Bell inequality violation. Quantum opto-electronic devices 10 and 20 use q and q distinct settings of beam splitter reflectivities $r_{a1}$, $r_{a2}$, $r_{a3}$, ... $r_{ap}$ and $r_{b1}$, $r_{b2}$, $r_{b3}$, ... $r_{bq}$, respectively, for fixed coherent state amplitudes $\alpha$ and $\beta$, respectively. The optimal settings depend on which state $|\Psi_{out}^{(k,S)}\rangle$ they have generated and are trying to certify and measured parameters of the system, such as detection efficiency, current losses in optical path etc.

This process is repeated many times until the quantum opto-electronic devices 10 and 20 have a statistically significant set of outcomes for each combination of reflectivities. Quantum opto-electronic devices 10 and 20 may then communicate these statistics between them over an authenticated classical channel, to check if the Bell inequality is violated, proving that the measurement statistics could have only occurred due to entanglement of their shared state.

As a specific example, the quantum opto-electronic devices 10 and 20 may choose to use p=q=2 distinct settings each. Quantum opto-electronic device 10 uses $r_{a1}$ and $r_{a2}$, while the quantum opto-electronic device 20 uses $r_{b1}$ and $r_{b2}$. Quantum opto-electronic device 10 may assign an outcome X=+1 to events where no photons are transmitted by their local beam splitter 14, and X=−1 otherwise, while the quantum opto-electronic device 20 similarly may assign Y=+1 or Y=−1. By communicating their results and choice of coherent state amplitudes and reflectivity settings, they calculate the average value of (X×Y) for each combination of settings. From these averages they show that the Clauser- Horne-Shimony-Holt (CHSH) inequality [7] is violated and thus prove the entanglement of the shared state.

The optimal choice of the four reflectivity settings i.e. the ones maximizing the Bell parameter depends on the generated state i.e. the values of k and S. For the most common state k=0, S=1, the test succeeds provided the detector efficiencies at the quantum opto-electronic devices 10 and 20 are above 85%, even with very large transmission losses from 10 to 30, and 20 to 30.

The above example closes the prohibitive detection loophole [10] for Bell inequalities, providing unconditional proof of entanglement (device-independent security) at the cost of the high detector efficiency requirement. If the quantum opto-electronic devices 10 and 20 trust that their measurement apparatus have not been altered by a third party, they can relax the high efficiency requirement by switching to a secondary mode of operation. In this secondary operation mode, some measurement outcomes are filtered out. For example, the quantum opto-electronic device 10 may assign an outcome a=+1 to events where a photon is transmitted by their local beam splitter 14, and a=−1 to events where a photon is reflected, while other outcomes are filtered out. The Bell inequality may then be evaluated as before, but with a much lower efficiency requirement of 22%. This filtered Bell test provides proof of entanglement under the additional assumption that the measurement apparatus of the quantum opto-electronic devices 10 and 20 are trusted. This switchable mode of operation depending on the needs of the user, without any change to the hardware or essential characteristics, is an important feature of the scheme.

The test may be further improved by the quantum opto-electronic devices 10 and 20 employing p, q>2 measurement settings to evaluate chained Bell inequalities [9], by assigning additional outcomes to evaluate Collins-Gisin-Linden-Massar-Popescu (CGLMP) type inequalities [8], or through other means of entanglement testing such as Bell games or semidefinite or linear programming [10]. Component 3—Generation of a shared secret key via the quantum channel The entanglement test confirms the security of the quantum channel, allowing the quantum opto-electronic devices 10 and 20 to subsequently establish a shared secret key for private-key cryptography, i.e. perform QKD. This protocol is guaranteed by the laws of physics to be secure against attacks by a potential eavesdropper or another malicious agent. For example, the quantum opto-electronic device 20 could represent a bank, while the quantum opto-electronic device 10 represents a client, and the eavesdropper a malicious entity trying to obtain confidential information.

The protocol begins with the distribution of entangled states to the quantum opto-electronic devices 10 and 20 according to the disclosure—10 and 20 each generate a two-mode squeezed vacuum IT) and send one half to 30 which performs an entangling measurement and communicates the result to the quantum opto-electronic devices 10 and 20.

Once quantum entanglement has been established, the quantum opto-electronic devices 10 and 20 perform a measurement as described in the entanglement test above, by interfering with local coherent states 1$a$) and I3), respectively, on variable beam splitters 14, 24 and measuring the transmitted or reflected photons. However, in addition to the p, q settings for both subsystems, one of them, e.g. 10, uses an additional setting $r_{a_0}$. Many measurements are performed with the quantum opto-electronic device 10 choosing randomly from their p+1 settings, and the quantum opto-electronic device 20 choosing randomly from their q settings.

The p and q reflectivity settings for each party $r_{a1}$, $r_{a2}$, $r_{a3}$, ... $r_{ap}$ and $r_{b1}$, $r_{b2}$, $r_{b3}$, ... $r_{bq}$, are chosen numerically by computing subsystems to maximize the Bell inequality as before. The additional setting $r_{a_0}$ is chosen such that when the quantum opto-electronic device 10 uses this setting and the quantum opto-electronic device 20 uses $r_{b_1}$, the measurement results obtained by the quantum opto-electronic devices 10 and 20 are highly correlated. In other words, if the quantum opto-electronic device 10 obtains an outcome X and the quantum opto-electronic device 20 obtains an outcome Y, the quantum opto-electronic device 20 can easily obtain X by a fixed mathematical transform. For example, in the CHSH test described above, if the quantum opto-electronic device 10 measures zero photons and assigns X=+1, the quantum opto-electronic device 20 measures a non-zero number and assigns Y=−1, and vice versa. quantum opto-electronic device 20 can then flip their outcomes so that the quantum opto-electronic devices 10 and 20 obtain a shared series of symbols which form the secret key. The measurements for other combinations of settings, are used to perform a Bell test as described in Component 2. To maximize the key generation rate, the quantum opto-electronic devices 10 and 20 should use the settings $r_{a_0}$ and $r_{b_1}$ with high probability so that the majority of measurements generate key symbols, leaving just enough other measurements to reliably perform the entanglement test.

Once the quantum opto-electronic devices 10 and 20 have ensured that the Bell inequality is violated and that their symbols were generated from an entangled quantum state, the laws of physics ensure that the malicious agent, by intercepting the quantum states, could have only obtained limited information about the measurement results and the key. In this device-independent scheme, this privacy holds even if the eavesdropper has infiltrated 30, or has fabricated the detectors at the quantum opto-electronic devices 10 and 20.

If the local detectors at the quantum opto-electronic devices 10 and 20 are trusted, the parties may switch the QKD scheme to a secondary mode of operation by employing the filtered Bell test as described in Component 2. The additional trust assigned to the detectors allows one to remove the requirement of high efficiency detectors, increasing the key generation rate.

In a real-life scenario there may be a small amount of errors between the quantum opto-electronic devices 10 and 20's key symbols, so they must perform classical information reconciliation (error correction) over an authenticated classical channel using well known algorithms such as low-density-parity-check (LDPC) codes [12]. This process reveals partial information to an eavesdropper, so that as a final step, the quantum opto-electronic devices 10 and 20 perform privacy amplification using universal hash functions.

They now share a completely random private key which the eavesdropper has no knowledge of, so they can safely encrypt and decrypt a message using a one-time pad or other symmetric key algorithms.

Possible Applications

Earth-space quantum communications—the protocol can be used as a means to distribute multiphoton entanglement and produce a shared secret key between two distant locations on Earth with a help of a shared satellite on a low Earth orbit (LEO) or a geostationary orbit (GEO).

Free-space ground and space quantum communication—the scheme can be used for distribution of multiphoton entanglement and producing a shared secret key between locations on Earth (buildings, vehicles, vessels, or planes) or in space (e.g. satellites, space ships or stations).

Fiber-based quantum communication—the protocol can be used for distribution of multiphoton entanglement and producing a shared secret key between locations connected with an optical fiber.

Quantum-enhanced optical phase estimation—the entanglement distribution protocol (Component 1) can be used to generate states that approximate the performance of an optimal probe in sensing very small changes in a path of a light beam in noisy conditions.

REFERENCES

The numbers in square brackets refer to the following publications:

[1] N. Gisin, R. Thew, *Quantum communication*, Nat. Photonics 1, 165 (2007).
[2] J.-P. Bourgoin et al. *A comprehensive design and performance analysis of low Earth orbit satellite quantum communication*, New J. Phys. 15, 023006 (2013).
[3] M. Stobińska, P. Sekatski, A. Buraczewski, N. Gisin, G. Leuchs, *Bell-inequality tests with macroscopic entangled states of light*, Phys. Rev. A 84, 034104 (2011).
[4] J. Yin et al. *Satellite-based entanglement distribution over 1200 kilometers*, Science 356, 1140 (2017).
[5] J.-W. Pan et al. *Multiphoton entanglement and interferometry*, Rev. Mod. Phys. 84, 777 (2012).
[6] A. Dutt et al. *On-chip optical squeezing*, Phys. Rev. Applied 3, 044005 (2015).
[7] J. F. Clauser, M. A. Horne, A. Shimony, R. A. Holt, *Proposed experiment to test local hidden-variable theories*, Phys. Rev. Lett. 23, 880 (1969).
[8] D. Collins, N. Gisin, N. Linden, S. Massar, S. Popescu, *Bell Inequalities for Arbitrarily High-Dimensional Systems*, Phys. Rev. Letts. 88, 040404 (2002).
[9] S. L. Braunstein, C. M. Caves, *Wringing out better Bell inequalities*, Ann. Phys. 202, 22 (1990).
[10] N. Brunner, D. Cavalcanti, S. Pironio, V. Scarani, S. Wehner, *Bell nonlocality*, Rev. Mod. Phys. 86, 419 (2014).
[11] M. B. Plenio, *Logarithmic negativity: a full entanglement monotone that is not convex*, Phys. Rev. Lett. 95, 090503 (2005).
[12] R. G. Gallager, *Low density parity check codes*, IRE Trans. Inf. Theory 8, 21 (1962).
[13] A. E. Lita, A. J. Miller, S. W. Nam, *Counting near-infrared single-photons with 95% efficiency*, Opt. Express 16, 3032 (2008).
[14] M. E. Mycroft, T. McDermott, A. Buraczewski, M. Stońiska, *Proposal for the distribution of multiphoton entanglement with optimal rate-distance scaling*, Phys. Rev. A 107, 012607 (2023). (preprint located at https://arxiv.org/abs/1812.10935).
[15] L.-J. Wang et al., *Experimental authentication of quantum key distribution with post-quantum cryptography*, npj Quantum Inf. 7, 67 (2021).

The invention claimed is:

1. A method for generating a cryptographic key for data encryption and/or decryption, including steps of:
a) producing, at a first quantum opto-electronic device using a first optical source pumped by a first pulsed laser system, a first entangled two-mode state of light, wherein the first entangled two-mode state of light includes a signal beam $a_1$ and an idler beam $a_2$; and producing, at a second quantum opto-electronic device using a second optical source pumped by a second pulsed laser system, a second entangled two-mode state of light, wherein the second entangled two-mode state of light includes a signal beam $b_1$ and an idler beam $b_2$;
b) multiplexing the idler beam $a_2$ with a coherent pulsed light produced by a first coherent pulsed laser source on a first optical multiplexer and the idler beam $b_2$ with a coherent light produced by the second coherent pulsed laser source on a second optical multiplexer in such a way that the idler beams $a_2$ and $b_2$ are multiplexed with pulsed coherent light beams either in time or frequency;
c) sending the multiplexed idler beams $a_2$ and $b_2$ to a quantum interference and measurement device, in particular either located at a same place as the first quantum opto-electronic device or the second quantum opto-electronic device or at a distance from them;
d) at the quantum interference and measurement device, demultiplexing the idler beam $a_2$ from the pulsed coherent beam at a first optical demultiplexer configured to use the same multiplexing method as the first optical multiplexer and subsequently measuring optical phase, polarization, wavelength, intensity and arrival time of the pulsed coherent beam at a first optical measurement device, and
demultiplexing the idler beam $b_2$ from the pulsed coherent beam at a second optical demultiplexer configured to use the same multiplexing method as the second optical multiplexer and subsequently measuring optical phase, polarization, wavelength, intensity and arrival time of the pulsed coherent beam at a second optical measurement device;
e) at a computing and control subsystem located at the quantum interference and measurement device, analyzing readouts from the first optical measurement device along with readouts from the second optical measurement device and steering a first optical correction device and a second optical correction device to compensate fluctuations in optical phase, polarization, wavelength and time of the idler beams $a_2$ and $b_2$ in such a way that they possess the same optical phase, polarization, wavelength, intensity and arrival time at a beam splitter;
f) interfering the idler beams $a_2$ with $b_2$ on the beam splitter and measuring therefrom a first number of photons at a first photon detector and a second number of photons at a second photon detector for the idler beams $a_2$ and $b_2$ passing through the beam splitter;
g) using the computing and control subsystem, sending the measured first number of photons and the second number of photons from the quantum interference and measurement device to the first quantum opto-electronic device and the second quantum opto-electronic device respectively, so that the signal beams $a_1$ and $b_1$ share an entangled state of light $|\Psi_{out}^{(k,S)}\rangle$, parametrized by the first number of photons and the second number of photons;
h) at the first quantum opto-electronic device, interfering on a first variable beam splitter a shared state of the first signal beam $a_1$ with a first coherent state $|\alpha\rangle$ of said first optical source and measuring therefrom first transmitted and reflected beams with photon detectors;
i) at the second quantum opto-electronic device, interfering on a second variable beam splitter a shared state of the second signal beam $b_1$ with a second coherent state

|β⟩ of said second optical source and measuring therefrom second transmitted and reflected beams with photon detectors;

j) repeating step h) for a plurality of different reflectivities $r_a$ of the first variable beam splitter, generating therefrom a first plurality of measurements stored in a first computing and control device;

k) repeating step i) for a plurality of different reflectivities $r_b$ of the second variable beam splitter, generating therefrom a second plurality of measurements stored in a second computing and control device;

l) generating, at the first computing and control device, a first cryptographic key as a function of a first portion of the first plurality of measurements and generating, at the second computing and control device, a second cryptographic key as a function of a first portion of the second plurality of measurements;

m) performing an entanglement test of;
   i) the first cryptographic key as a function of a second portion of the first plurality of measurements, wherein the second portion of the first plurality of measurements is different from the first portion of the first plurality of measurements, and
   ii) the second cryptographic key as a function of a second portion of the second plurality of measurements, wherein the second portion of the second plurality of measurements is different from the first portion of the second plurality of measurements.

2. The method according to claim 1, wherein step m) further includes:
   m1) correcting any symbol error of the first cryptographic key generated at the first quantum opto-electronic device and/or correcting any symbol error of the second cryptographic key generated at the second quantum opto-electronic device;
   m2) computing a hash function for the corrected first cryptographic key of the first quantum opto-electronic device and on the corrected second cryptographic key of the second quantum opto-electronic device.

3. The method according to claim 2, wherein in step j) and k) the plurality of different reflectivities ra and rb are chosen randomly and are different.

4. The method according to claim 3, wherein the first entangled two-mode state of light and the second entangled two-mode state of light are squeezed vacuum state of light.

5. The method according to claim 2, wherein the first entangled two-mode state of light and the second entangled two-mode state of light are squeezed vacuum state of light.

6. The method according to claim 5, wherein measurements performed in step j) and k) are performed before measurements in step f).

7. The method according to claim 2, wherein measurements performed in step j) and k) are performed before measurements in step f).

8. The method according to claim 2, wherein in step f) the measurement of first number of photons and/or second number of photons includes at least one out of a photon-number-resolving detector, one or more single-photon detectors, photo-diodes, or a combination thereof.

9. The method according to claim 1, wherein in step j) and k) the plurality of different reflectivities $r_a$ and $r_b$ are chosen randomly and are different.

10. The method according to claim 9, wherein the first entangled two-mode state of light and the second entangled two-mode state of light are squeezed vacuum state of light.

11. The method according to claim 10, wherein measurements performed in step j) and k) are performed before measurements in step f).

12. The method according to claim 9, wherein measurements performed in step j) and k) are performed before measurements in step f).

13. The method according to claim 1, wherein the first entangled two-mode state of light and the second entangled state of light are squeezed vacuum state of light.

14. The method according to claim 13, wherein measurements performed in step j) and k) are performed before measurements in step f).

15. The method according to claim 1, wherein measurements performed in step j) and k) are performed before measurements in step f).

16. The method according to claim 1, wherein in step f) the measurement of first number of photons and/or second number of photons includes at least one of: a photon-number-resolving detector, one or more single-photon detectors, photo-diodes, or a combination thereof.

17. The method according to claim 1, wherein in step h) and i) the measurement of first transmitted and reflected number of photons and/or second transmitted and reflected number of photons at includes at least one out of: a photon-number-resolving detector, one or more single-photon detectors, photo-diodes, or a combination thereof.

18. A non-transitory computer-readable storage medium comprising instructions which, when executed by at least one computer, cause the computer to carry out method steps including:
   a) producing, at a first quantum opto-electronic device by using a first optical source pumped by a first pulsed laser system, a first entangled two-mode state of light, wherein the first entangled two-mode state of light includes a signal beam $a_1$ and an idler beam $a_2$; and
   producing, at a second quantum opto-electronic device using a second optical source pumped by a second pulsed laser system, a second entangled two-mode state of light, wherein the second entangled two-mode state of light includes a signal beam $b_1$ and an idler beam $b_2$;
   b) multiplexing the idler beam $a_2$ with a coherent pulsed light produced by a first coherent pulsed laser source on a first optical multiplexer and the idler beam $b_2$ with a coherent light produced by the second coherent pulsed laser source on a second optical multiplexer in such a way that the idler beams $a_2$ and $b_2$ are multiplexed with pulsed coherent light beams either in time or frequency;
   c) sending the multiplexed idler beams $a_2$ and $b_2$ to a quantum interference and measurement device, in particular either located at a same place as the first quantum opto-electronic device or the second quantum opto-electronic device or at a distance from them;
   d) at the quantum interference and measurement device, demultiplexing the idler beam $a_2$ from the pulsed coherent beam at a first optical demultiplexer configured to use the same multiplexing method as the first optical multiplexer and subsequently measuring optical phase, polarization, wavelength, intensity and arrival time of the pulsed coherent beam at a first optical measurement device, and respectively demultiplexing the idler beam $b_2$ from the pulsed coherent beam at a second optical demultiplexer configured to use the same multiplexing method as the second optical multiplexer and subsequently measuring optical phase, polarization, wavelength, intensity and arrival time of the pulsed coherent beam at a second optical measurement device;

e) at a computing and control subsystem located at the quantum interference and measurement device, analyzing readouts from the first optical measurement device along with readouts from the second optical measurement device and steering a first optical correction device and a second optical correction device to compensate fluctuations in optical phase, polarization, wavelength and time of the idler beams $a_2$ and $b_2$ in such a way that they possess the same optical phase, polarization, wavelength, intensity and arrival time at a beam splitter;

f) interfering the idler beams $a_2$ with $b_2$ on the beam splitter and measuring therefrom a first number of photons at a first photon detector and a second number of photons at a second photon detector for the idler beams $a_2$ and $b_2$ passing through the beam splitter;

g) by using the computing and control subsystem, sending the measured first number of photons and the second number of photons from the quantum interference and measurement device to the first quantum opto-electronic device and the second quantum opto-electronic device respectively, so that the signal beams $a_1$ and $b_1$ share an entangled state of light $|\Psi_{out}^{(k,S)}\rangle$, parametrized by the first number of photons and the second number of photons;

h) at the first quantum opto-electronic device, interfering on a first variable beam splitter a shared state of the first signal beam $a_1$ with a first coherent state $|a\rangle$ of said first optical source and measuring therefrom first transmitted and reflected beams with photon detectors;

i) at the second quantum opto-electronic device, interfering on a second variable beam splitter a shared state of the second signal beam $b_1$ with a second coherent state $|\beta\rangle$ of said second optical source and measuring therefrom second transmitted and reflected beams with photon detectors;

j) repeating step h) for a plurality of different reflectivities $r_a$ of the first variable beam splitter, generating therefrom a first plurality of measurements stored in a first computing and control device;

k) repeating step i) for a plurality of different reflectivities $r_b$ of the second variable beam splitter, generating therefrom a second plurality of measurements stored in a second computing and control device;

l) generating, at the first computing and control device, a first cryptographic key as a function of a first portion of the first plurality of measurements and generating, at the second computing and control device, a second cryptographic key as a function of a first portion of the second plurality of measurements;

m) performing an entanglement test of:
  i) the first cryptographic key as a function of a second portion of the first plurality of measurements, wherein the second portion of the first plurality of measurements is different from the first portion of the first plurality of measurements, and
  ii) the second cryptographic key as a function of a second portion of the second plurality of measurements, wherein the second portion of the second plurality of measurements is different from the first portion of the second plurality of measurements.

19. A quantum opto-electronic computer system to generate a cryptographic key for data encryption and/or decryption, the system including a first quantum opto-electronic device, a second quantum opto-electronic device and a third quantum interference and measurement electronic device, the first quantum opto-electronic device including a first optical source, a first variable beam splitter, a first photon detector and/or a second photon detector, the second quantum opto-electronic device including a second optical source, a second variable beam splitter, a third photon detector and/or a fourth photon detector, the third quantum interference and measurement electronic device including a third beam splitter, a fifth photon detector and a sixth photon detector, wherein the quantum opto-electronic computer system, being implemented by the first quantum opto-electronic device, is configured to:

produce, using the first optical source, a first entangled two-mode state of light, wherein the first entangled two-mode state of light includes a signal beam $a_1$ and an idler beam $a_2$;

multiplex said idler beam $a_2$ with a pulsed coherent beam at an optical multiplexer and send to the third quantum interference and measurement electronic device;

interfere, on the first variable beam splitter, a shared state of the signal beam $a_1$ with a first coherent state $|\alpha\rangle$ of the first optical source and measure therefrom a first number of transmitted and/or reflected photons at the first and/or second photon detectors;

repeat said interference for a plurality of different reflectivities $r_a$ of the first variable beam splitter and generate therefrom a first plurality of measurements;

generate a first cryptographic key as a function of a first portion of the first plurality of measurements;

perform an entanglement test of the first cryptographic key as a function of a second portion of the first plurality of measurements, wherein the second portion of the first plurality of measurements is different from the first portion of the first plurality of measurements;

wherein the quantum opto-electronic computer system, being implemented by the second quantum opto-electronic device, is further configured to:

produce, using the second optical source, a second entangled two-mode state of light, wherein the second entangled two-mode state of light includes a signal beam $b_1$ and an idler beam $b_2$;

multiplex the idler beam $b_2$ with a pulsed coherent beam at an optical multiplexer and send to the third quantum interference and measurement electronic device;

interfere, on the second variable beam splitter, a shared state of the signal beam $b_1$ with a second coherent state $|\beta\rangle$ of the second optical source and measuring therefrom a second number of transmitted and/or reflected photons at the third and/or fourth photon detectors;

repeat said interference for a plurality of different reflectivities $r_b$ of the second variable beam splitter and/or a plurality of different amplitudes/phases of the second coherent state and generate therefrom a second plurality of measurements;

generate a second cryptographic key as a function of a first portion of the second plurality of measurements;

perform an entanglement test of the second cryptographic key as a function of a second portion of the second plurality of measurements, wherein the second portion of the second plurality of measurements is different from the first portion of the second plurality of measurements; and wherein the quantum opto-electronic computer system, being implemented by the third quantum interference and measurement electronic device, is further configured to:

demultiplex the idler beam $a_2$ from a pulsed coherent beam at a first optical demultiplexer and subsequently measure optical phase, polarization, wavelength, intensity and arrival time of the pulsed coherent beam at a first optical measurement device;

using a first optical correction device, compensate fluctuations in optical phase, polarization, wavelength and time of the idler beam $a_2$ in such a way that it possesses a desired optical phase, polarization, wavelength, intensity and arrival time at the third beam splitter;

demultiplex the idler beam $b_2$ from a pulsed coherent beam at a second optical demultiplexer and subsequently measure optical phase, polarization, wavelength, intensity and arrival time of the pulsed coherent beam at a second optical measurement device;

using a second optical correction device, compensate the fluctuations in optical phase, polarization, wavelength and time of the idler beam $b_2$ in such a way that it possesses a desired optical phase, polarization, wavelength, intensity and arrival time at the third beam splitter;

interfere the idler beam $a_2$ with the idler beam $b_2$ on the third beam splitter and measure with photon detectors therefrom a first number of photons and a second number of photons passing through the third beam splitter;

transmit the first number of photons and the second number of photons to the first quantum opto-electronic device and second quantum opto-electronic device, so that the signal beam $a_1$ and the signal beam $b_1$ share an entangled state of light $|\Psi_{out}^{(k,S)}\rangle$, parametrized by the first number of photons and the second number of photons.

20. The quantum opto-electronic computer system according to claim 19, further comprising:

correct, by the first quantum opto-electronic device, any symbol error of the generated first cryptographic key;

perform, by the first quantum opto-electronic device, hashing on the corrected first cryptographic key; and correct, by the second quantum opto-electronic device, any symbol error of the generated second cryptographic key;

perform, by the second quantum opto-electronic device, hashing on the corrected second cryptographic key.

* * * * *